United States Patent
Boileau

[15] 3,638,704
[45] Feb. 1, 1972

[54] PNEUMATIC TIRE

[72] Inventor: Jacques Boileau, Clermont-Ferrand, France

[73] Assignee: Compagnie Generale Des Etablissements Michelin, raison sociale Michelin & Cie, Clermont-Ferrand (Puy-de-Dome), France

[22] Filed: Dec. 3, 1968

[21] Appl. No.: 780,841

[30] Foreign Application Priority Data

Dec. 18, 1967 France.....................132766
Feb. 3, 1968 France.....................141171

[52] U.S. Cl.......................................152/353, 152/DIG. 12
[51] Int. Cl.......................................B60c 13/00
[58] Field of Search.....................................152/353, DIG. 12

[56] References Cited

UNITED STATES PATENTS

| | | | |
|---|---|---|---|
| 3,253,634 | 5/1966 | De Young | 152/353 |
| 2,155,972 | 4/1939 | Hower | 152/353 |
| 2,789,616 | 4/1957 | Cuthbertson et al. | 152/353 |
| 3,258,050 | 6/1966 | Nonnamaker | 152/353 |
| 3,365,345 | 1/1968 | Cooper et al. | 152/353 |

Primary Examiner—Arthur L. La Point
Assistant Examiner—Richard A. Bertsch
Attorney—Brumbaugh, Graves, Donohue and Raymond

[57] ABSTRACT

A tire of the radial-carcass-type having a decorative circumferential band or ring on one sidewall is formed with grooves in the sidewall on either side of the circumferential ring to relieve the elastomer of which the ring is formed from the alternating stresses of tension and compression when the tire is in service and thereby retard the aging of the elastomer.

4 Claims, 4 Drawing Figures

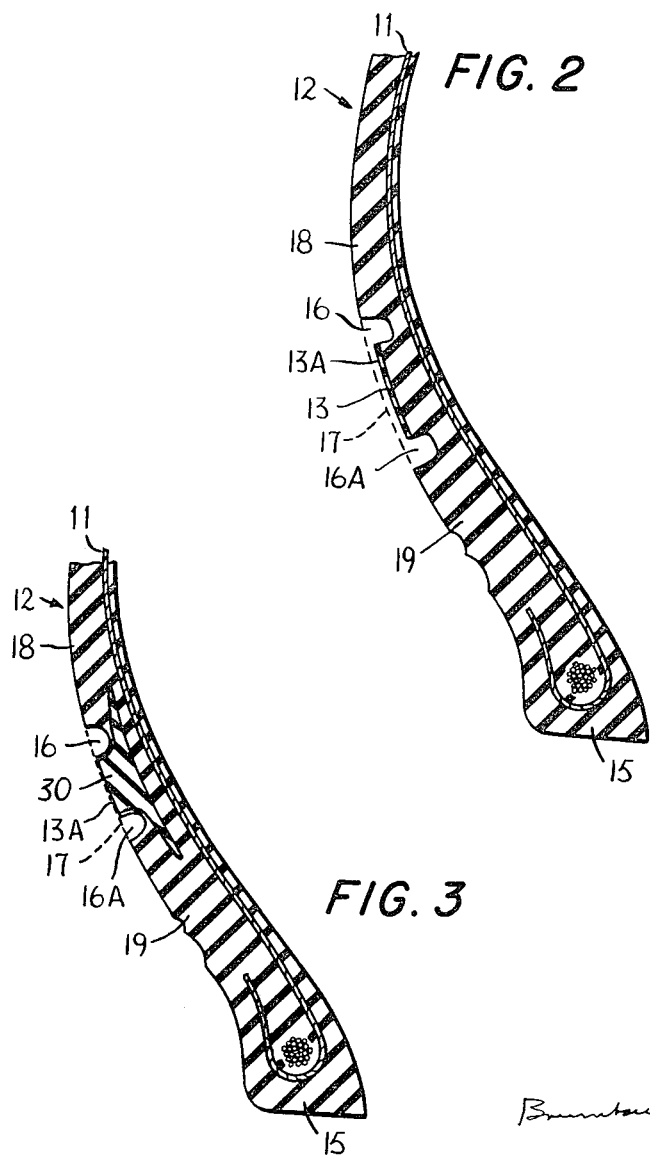
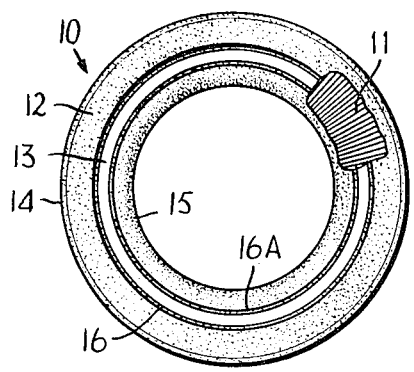
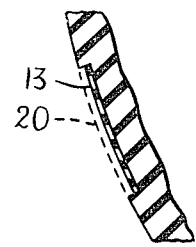
FIG. 1
FIG. 2
FIG. 2A
FIG. 3
INVENTOR.
JACQUES BOILEAU

PNEUMATIC TIRE

BACKGROUND OF THE INVENTION

This invention relates to improvements in tires and, more particularly, to tires of the radial-carcass type, at least one of the two sidewalls of which is decorated with a design, generally in form of a ring, consisting of an elastomer other than black forming one body with the black elastomer which covers the radial carcass. The invention comprises tires incorporating these improvements and a method of manufacture of such tires.

Tires of the comparatively recent radial-carcass kind are characterized by the fact that the cords composing their carcass are arranged in planes passing through the axis of tire rotation, which imparts to the sidewalls of such tires very high flexibility. This quality causes them to deform much more during rolling than do the sidewalls of tires of the crossed-carcass type.

It has been found than an elastomer which is other than black and decorates the sidewall of a tire ages considerably faster when it is used in combination with a radial-carcass than when it is applied on the sidewall of a tire with a crossed-carcass. In radial-carcass tires, cracks are quickly formed in the elastomer other than black and it rapidly appears soiled. In order to forestall this rapid aging, attempts have been made to improve the quality of the ornamental elastomer, i.e., the elastomer other than black, and also to increase its thickness. However, the improvements thereby obtained have not been substantial. Moreover, the elastomers of improved quality are considerably more costly than the elastomers which can be used on crossed-carcass tires without running the risk that after a short while the defects mentioned above will become visible.

SUMMARY OF THE INVENTION

An object of the invention is to facilitate the use of ornamental elastomers of common and inexpensive quality in combination with radial-carcass tires, without the risk of premature appearance of the defects in question. Another object of the invention is to protect the surface of the ornamental elastomer as much as possible from the alternating stresses of tension and compression to which this surface is subjected on the sidewall of a radial-carcass tire during rolling.

The foregoing and other objects are attained in accordance with the invention by the provision of a tire of the radial-carcass type which comprises two sidewalls each of which has one or more layers of black elastomer covering the radial-carcass on the outside and at least one of which has on its outer surface at least one circumferential ring made of an elastomer other than black and forming one piece with the black elastomer of the sidewall. The circumferential ring made of an elastomer other than black is placed between two circumferential grooves, and the outer surface of the ring, as seen in radial cross section, coincides with, or is recessed with respect to, an imaginary line which, without substantial modification of the sidewall curvature, connects the contour of the portion of the sidewall situated radially outside the groove having the larger circumference to the contour of the portion of the sidewall situated radially inside the groove having the smaller circumference.

By virtue of the circumferential grooves, the elastomer other than black is well insulated mechanically from the rest of the outer surface of the sidewall of the tire. The deformations of the sidewall during rolling are concentrated essentially in the two grooves between which this surface extends, while the arrangement of such surface, either coinciding with the normal contour line of the sidewall or recessed in relation to such line, results in that the said surface is located in the proximity of the neutral line of the sidewall. Experience has shown that these two measures cooperate effectively in order to delay considerably the appearance of cracks on the surface of the ornamental elastomer, so that it becomes possible, in accordance with another characteristic of the invention, to decrease substantially the thickness of the layer of such elastomer as compared to the customarily provided thickness.

In a preferred form of embodiment of the invention, this thickness may range from approximately 0.2 millimeters to approximately 2.0 millimeters.

This decrease in thickness, made possible by the measures provided by the invention, also facilitates manufacture of the portion of the sidewall comprising the decorative elastomer by a simple method which eliminates the operation of grinding the outer surface of this elastomer. Grinding renders the surface furrowed and thereby contributes to its aging and cracking. The method in accordance with the invention comprises the following steps, performed for each ring:

a. A thin circumferential band made of a crude elastomer other than black is caused to adhere to the still-crude black elastomer sidewall of the tire.

b. The tire is conventionally vulcanized in a mold the interior wall portion of which located opposite the zone of the circumferential band of elastomer other than black may be made to project in order to reduce the thickness of the sidewall in that zone.

c. By means of grinding, there are formed in the vulcanized tire sidewall two circumferential grooves which are spaced apart from each other radially. Each groove is approximately at one edge of the band of elastomer other than black, and the grinding is effected over sufficient depth for the black elastomer underneath the edges of the band to appear.

BRIEF DESCRIPTION OF THE DRAWING

An understanding of additional aspects of the invention may be gained from a consideration of the following detailed description of two representative embodiments thereof, taken in conjunction with the appended figures of the drawing, wherein:

FIG. 1 is a view in side elevation, on a small scale, of a tire with a radial carcass, partly broken away to shown the cords of the carcass;

FIG. 2 is a radial cross section of the part of the sidewall of a tire which comprises a decorative band the characteristics of which are those provided for by the invention and which can be obtained by the method in accordance with the invention;

FIG. 2A is a fragmentary view of the structure of FIG. 2 at an intermediate stage of the manufacturing process; and FIG. 3 is a view similar to FIG. 2 showing an alternate embodiment of the invention.

DESCRIPTION OF THE PREFERRED EMBODIMENTS

The tire cover 10 shown in FIG. 1 comprises a carcass 11 having cords placed in radial planes: i.e., in planes passing through the axis of rotation of the tire. The sidewall 12 of the cover has an ornamental motive, in this example in the shape of a single ring 13, situated at about middistance between the tread 14 and the bead 15 of the tire and made of an elastomer other than black, for example white or red, contrasting with the rest of the sidewall, the latter being made of a black elastomer covering all of the radial carcass 11. The ring 13 extends between two grooves 16 and 16A provided in the black elastomer of the sidewall.

In the embodiment shown in FIG. 2, the ring 13 is made of a white elastomer the thickness of which is uniformly 0.5 millimeters. This ring is bordered by two grooves 16 and 16A which are obtained by simultaneous grinding of the black elastomer of sidewall 12 and of each of the edges of the ring. The axially outer surface 13A of the ring 13 is recessed with respect to the imaginary line 17 which connects, without abrupt change of the curvature, the contour zones 18 and 19 of the sidewall situated, respectively, radially on the outside of the groove 16 and radially on the inside of groove 16A. The contour of the sidewall and of the borders of the ring 13 before grinding of the grooves 16 and 16A is indicated by the line in dashes 20 (FIG. 2A) on the sidewall part shown to the right of FIG. 2.

The embodiment illustrated in FIG. 3 is different from the one in FIG. 2 essentially in that the ornamental elastomer 30 in the form of a ring has a thickness which diminishes towards each of the two edges of the ring. The edges of the ring are conventionally imbedded in the black elastomer constituting the sidewall 12. The outer surface 13A of this ring coincides substantially with the imaginary line 17 which without any abrupt change in the curvature connects the contour of the zone 18 of the sidewall located radially outside the groove 16 with the contour of the zone 19 of the sidewall located radially within the groove 16A.

Of course, it is possible to provide conventional circumferential ridges consisting of black elastomer, as an extra thickness on the sidewall, in order to protect the ornamental elastomer against contact with lateral obstacles, such as the edges of sidewalks. However, such ridges in relief on the sidewall of the tire are not to be taken into consideration when determining the path of the imaginary line which connects the contours of the sidewall zones situated on either side of the two grooves and which fixes the border beyond which the surface of the ornamental elastomer must not extend.

Many modifications and variations of the specific embodiments disclosed above will readily occur to those skilled in the art. All such modifications and variations are included within the intended scope of the invention as defined by the following claims.

I claim:

1. A tire comprising a radial carcass, a pair of sidewalls, and a black elastomer covering the carcass on the outside, at least one of the sidewalls having on its outer surface at least one circumferential ring made of an elastomer other than black, a pair of circumferential grooves formed in the black elastomer on either side of the ring and reducing the thickness of the black elastomer within the area of the grooves, the axially outermost portion of the ring extending no farther than an imaginary line which, without substantial modification of the sidewall curvature, connects the contour of the portion of the sidewall situated radially outside the groove having the larger circumference to the contour of the portion of the sidewall situated radially inside the groove having the smaller circumference.

2. A tire according to claim 1 wherein the axially outer surface of the circumferential ring is recessed with respect to said imaginary line.

3. A tire according to claim 1 wherein the axially outer surface of the circumferential ring substantially coincides with said imaginary line.

4. A tire according to claim 1 wherein the thickness of the circumferential ring is substantially within the range of 0.2 to 2.0 millimeters.

* * * * *

PO-1050
(5/69)

UNITED STATES PATENT OFFICE
CERTIFICATE OF CORRECTION

Patent No. 3,638,704        Dated Feb. 1, 1972

Inventor(s) Jacques Boileau

It is certified that error appears in the above-identified patent and that said Letters Patent are hereby corrected as shown below:

On the Title Page, the identification of the Foreign Application Priority Data [30], the date "Feb. 3, 1968" should be --Feb. 23, 1968--. Col. 1, line 20, "than" (first occurrence) should be --that--. Col. 2, line 38, "shown" should be --show--.

Signed and sealed this 22nd day of August 1972.

SEAL)
ttest:

DWARD M. FLETCHER, JR.        ROBERT GOTTSCHALK
ttesting Officer        Commissioner of Patents